United States Patent [19]

Maruoka

[11] Patent Number: 5,212,553
[45] Date of Patent: May 18, 1993

[54] TELEVISION RECEIVER WITH SELECTIVE MENU DISPLAY

[75] Inventor: Kazuhisa Maruoka, Kanagawa, Japan

[73] Assignee: Sony Corporation, Tokyo, Japan

[21] Appl. No.: 744,248

[22] Filed: Aug. 13, 1991

[30] Foreign Application Priority Data

Sep. 4, 1990 [JP] Japan .................................. 2-233664

[51] Int. Cl.$^5$ ........................ H04N 9/74; H04N 5/44
[52] U.S. Cl. ..................................... 358/188; 358/22; 358/183
[58] Field of Search ........................... 358/22, 183, 188

[56] References Cited

U.S. PATENT DOCUMENTS

| | | | |
|---|---|---|---|
| 4,270,145 | 5/1981 | Farina | 358/188 |
| 4,288,809 | 9/1981 | Yabe | 358/183 |
| 4,519,003 | 5/1985 | Scholz | 358/335 |
| 4,622,589 | 11/1986 | Bell | 358/183 |
| 4,626,892 | 12/1986 | Nortrup et al. | 358/22 C X |
| 4,821,102 | 4/1989 | Ichikawa et al. | 358/183 |
| 4,907,082 | 3/1990 | Richards | 358/188 |
| 5,019,910 | 5/1991 | Filmer | 358/193.1 |
| 5,034,820 | 7/1991 | Cho | 358/22 X |
| 5,119,200 | 6/1992 | Van Den Hombergh et al. | 358/188 |
| 5,126,832 | 6/1992 | Lee et al. | 358/183 |
| 5,134,486 | 7/1992 | Suzuki et al. | 358/183 |

FOREIGN PATENT DOCUMENTS

| | | |
|---|---|---|
| 0132382 | 1/1985 | European Pat. Off. . |
| 0309269 | 3/1989 | European Pat. Off. . |
| 0340643 | 11/1989 | European Pat. Off. . |
| 2633412 | 12/1989 | France . |

Primary Examiner—John K. Peng
Assistant Examiner—John W. Miller
Attorney, Agent, or Firm—Lewis H. Eslinger; Jay H. Maioli

[57] ABSTRACT

A television receiver with a menu display function has a BS tuner for producing a video signal and a sound signal from a received television signal that is broadcast from a satellite. The television receiver has a microcomputer for adding a menu display signal to the video signal so that menu information can be displayed on a display unit. The menu display signal represents a plurality of menu items in each of selectable menu modes, and the menu items are selectively erasable from the display unit.

4 Claims, 4 Drawing Sheets

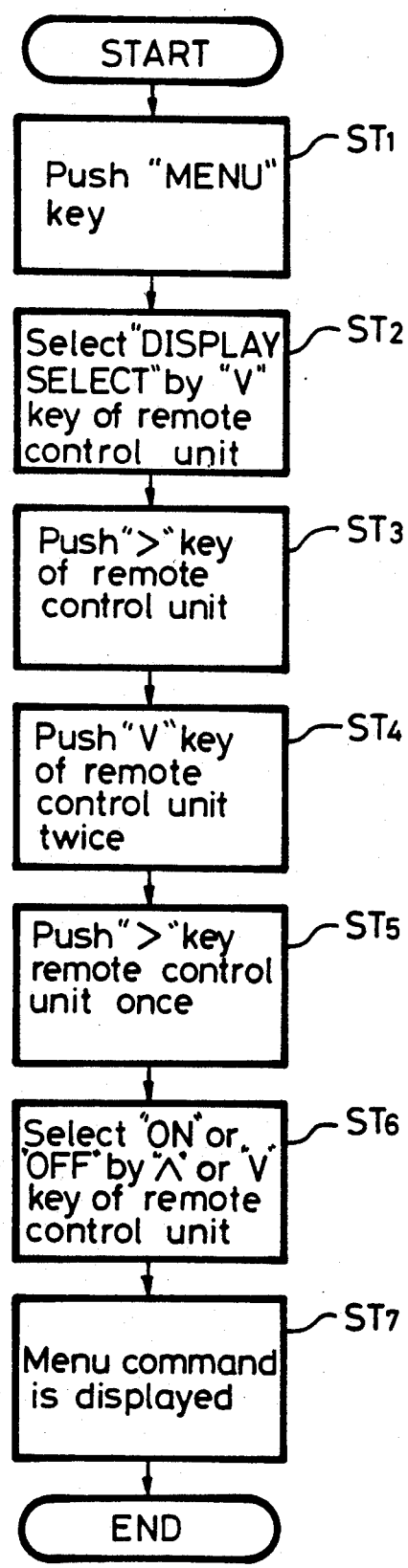

TELEVISION RECEIVER WITH SELECTIVE MENU DISPLAY

BACKGROUND OF THE INVENTION

1. Field of the Invention

The present invention relates to a television receiver having a menu display function with selective display of menu items.

2. Description of the Prior Art

Television receivers, BS tuners, and some other electronic devices that have recently become available have a menu display function for making themselves easier to handle as well as displaying high-quality images. The menu function enables CRT display units or the like to display menu items for facilitating various settings which would otherwise be rather complex for the user to adjust and establish. Those electronic devices, such as television receivers, which are capable of receiving high-definition broadcasts, and other broadcasts and communications via communication satellites that have newly been launched, however, require more and more difficult settings which may not easily be entered by ordinary users.

The conventional electronic devices which have a menu function display a plurality of standard menu items when in the menu display mode. The displayed standard menu items are permanently established when the electronic devices are designed, and some of the standard menu items may not be necessary for some users.

On the conventional electronic devices, it is possible for the user to turn on or off the entire set of standard menu items. However, the user cannot select a desired one or ones of the standard menu items and then turn on and off the selected standard menu item or items.

When the user wishes to select one of the standard menu items displayed on the display unit, therefore, the user may find the displayed menu information too awkward to deal with.

OBJECTS AND SUMMARY OF THE INVENTION

In view of the aforesaid problems of the conventional television receivers and other electronic devices with a menu function, it is an object of the present invention to provide a television receiver with a menu function or picture in picture function, which television receiver allows the user to select only the menu item or items he needs while leaving other undesirable standard menu items undisplayed.

According to the present invention, there is provided a television receiver comprising circuit means for producing a video signal and a sound signal from a received television signal, display means for displaying an image based on the video signal, and control means for controlling the circuit means to produce the video signal, the control means comprising means for adding to the video signal a menu display signal representing a plurality of selectively erasable menu items.

The control means comprises a character generator for generating characters representing the selectively erasable menu items, and a control unit for controlling the character generator.

The above and other objects, features, and advantages of the present invention will become apparent from the following description of an illustrative embodiment thereof to be read in conjunction with the accompanying drawings, in which like reference numerals represent the same or similar objects.

BRIEF DESCRIPTION OF THE DRAWINGS

FIG. 1 is a flowchart of an operation sequence of a television receiver according to the present invention;

DETAILED DESCRIPTION OF THE PREFERRED EMBODIMENT

The principles of the present invention are particularly useful when embodied in a television receiver with a BS tuner and BS converters for receiving satellite broadcasts, as shown in FIGS. 1 through 4. First, the arrangement of the television receiver will be described below with reference to FIG. 4.

Figure 4:
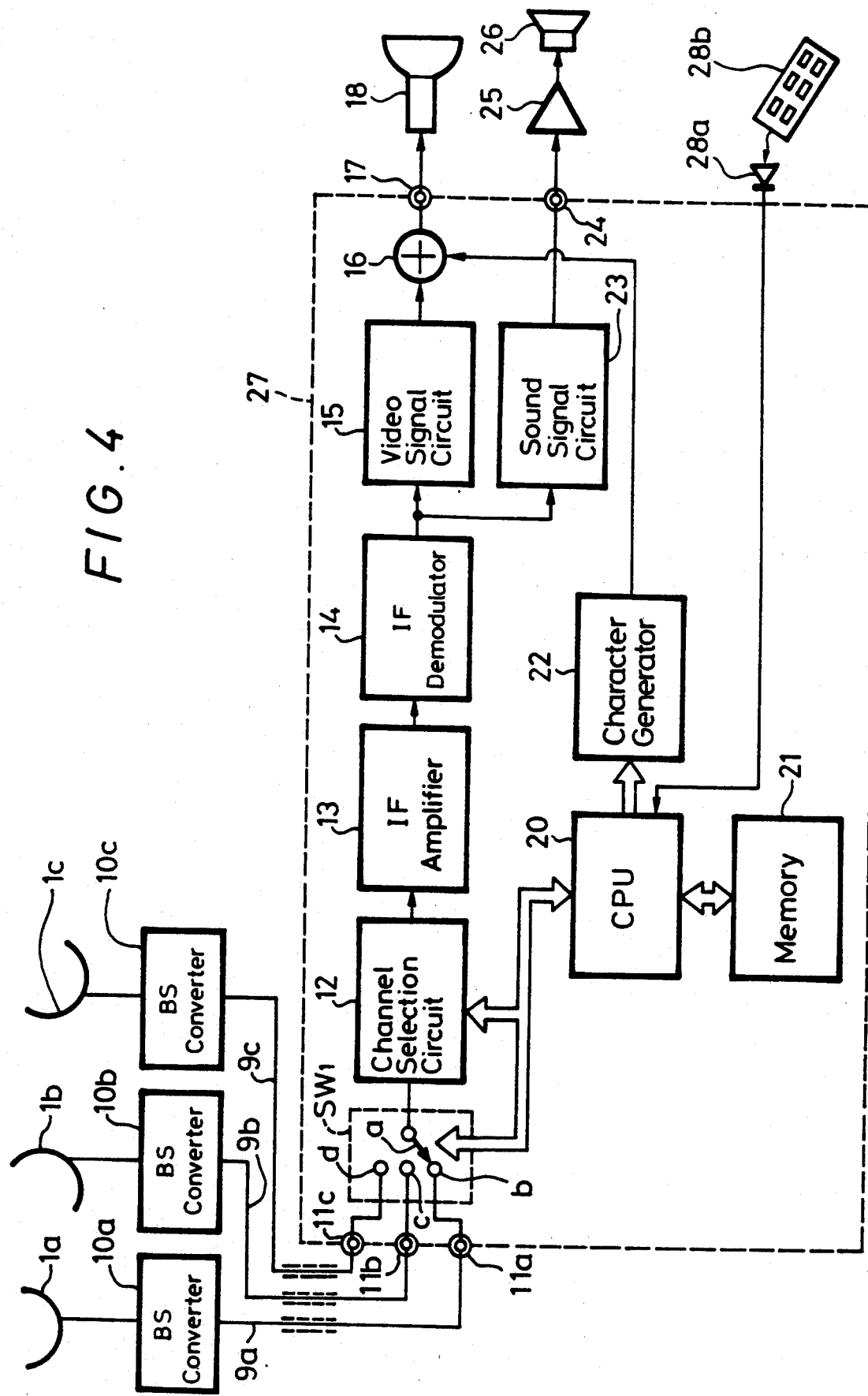
FIG. 4 is a block diagram of the television receiver according to the present invention.

As shown in FIG. 4, the television receiver includes BS antennas 1a, 1b, 1c in the form of parabolic or planar antennas for receiving dextrorotatory or levorotatory polarized radio waves from a plurality of different satellites. Each of the BS antennas 1a, 1b, 1c has a parabolic reflector, for example, for reflecting a received radio wave in an SHF band, a primary radiating element for receiving the reflected radio wave, and a circular-to-linear polarization converter for converting the dextrorotatory or levorotatory polarized wave into a linearly polarized wave. An RF output in the SHF band from the circular-to-linear polarization converter is supplied to the BS converter 10a, for example. In the BS converter 10a, the supplied RF signal is amplified by an RF amplifier, and the amplified signal is supplied to a mixer through a bandpass filter (BPF). In the mixer, the signal is mixed with a signal from a local oscillator, producing a BS-IF signal in a 1-GHz band, for example. The BS-IF signal from the mixer is then amplified by an intermediate-frequency amplifier, from which the amplified signal is supplied to an output terminal of the BS converter 10a. To the output terminal of the BS converter 10a, there is connected one end of a coaxial cable 9a, the other end of which is connected to an input terminal 11a of a BS tuner 27.

While the BS converter 10a has been described above, the other BS converters 10b, 10c are of the same construction as that of the BS converter 10a.

The BS-IF signals from the BS converters 10a, 10b, 10c are supplied respectively to the input terminals 11a, 11b, 11c of the BS tuner 27. The BS-IF signals are applied to respective fixed contacts b, c, d of an IF terminal selector switch SW1 whose movable contact a is connected to a channel selection circuit 12. The BS-IF signal which is selected by the IF terminal selector switch SW1 is therefore applied to the channel selection circuit 12, by which a desired channel CH is selected from the BS-IF signal. The channel selection circuit 12 includes an RF amplifier, a mixer, and a local oscillator. The mixer and the local oscillator serve to convert the BS-IF signal into an intermediate-frequency signal. The frequency produced by the local oscillator is variable depending on the selected channel.

The intermediate-frequency signal is then supplied from the channel selection circuit 12 to an intermediate-frequency amplifier 13. The intermediate-frequency amplifier 13 has an intermediate-frequency filter for removing unwanted signals other than the intermediate-frequency signal in the selected channel. In the inter-mediate-frequency amplifier 13, the intermediate-frequency signal is amplified, and passed through an AGC circuit to an amplitude limiter in which it is adjusted to a constant signal level, removing AM noise. Thereafter, the intermediate-frequency signal is frequency-demodulated by a frequency demodulator 14.

The frequency-demodulated signal from the frequency demodulator 14 is supplied to a video signal circuit 15 and a sound signal circuit 23. In the video signal circuit 15, a video signal is extracted from the baseband of the frequency-demodulated signal. The video signal is then supplied through an output terminal 17 to a display unit 18 such as a CRT or the like for displaying an image. In the sound signal circuit 23, a PCM sound signal transmitted by way of differential phase shift keying in the frequency-demodulated signal is demodulated into a sound signal. The sound signal is then supplied through an output terminal 24 and a driver amplifier 25 to a loudspeaker 26, from which the sound is radiated.

The BS tuner 27 has a control unit 20 such as a microcomputer (CPU) for controlling a character generator (CG) 22 which generates messages to be displayed in the form of characters. For example, the control unit 20 controls the CG 22 to supply a generated message to one of three primary output terminals, R (red), G (green), B (blue), of the video signal circuit 15, e.g., the output terminal G, so that the message is displayed in G color on the display unit 18. The CPU 20 is connected to a photosensor 28a for detecting commands transmitted from a remote control unit 28b, so that the CPU 20 can receive command data from the remote control unit 28b. The CPU 20 also serves to control the channel selection circuit 12. A memory 21 such as a ROM, RAM, or the like is connected to the CPU 20.

Operation of the television receiver shown in FIG. 1 will be described with reference to FIGS. 1, 2A through 2D, and 3A through 3E.

Figure 2A:
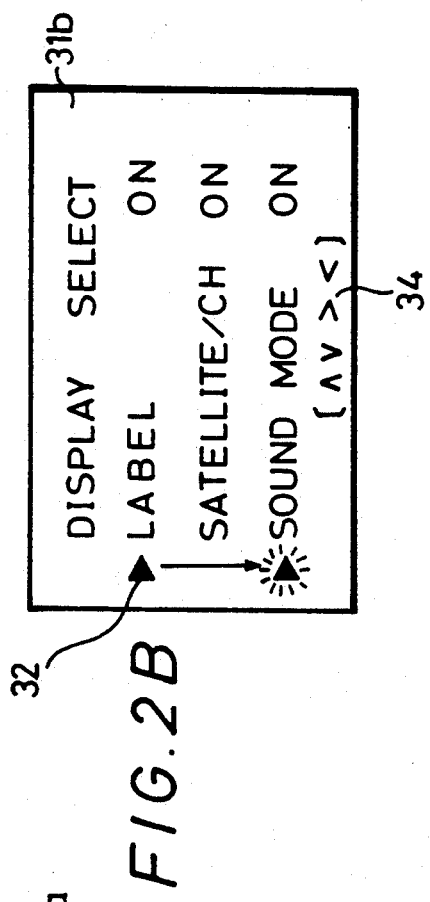
FIGS. 2A through 2D are views showing menu items displayed according to the operation sequence shown in FIG. 1.
Figure 2C:
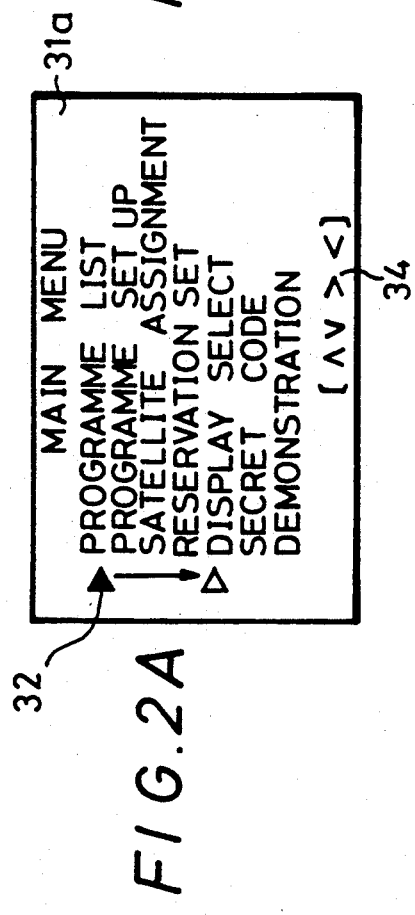

FIG. 1 shows an operation sequence for turning off a sound mode. FIGS. 2A through 2E show displayed menu items by way of example. In FIG. 1, after the power supply of the television receiver is turned on, a menu key on the remote control unit 28b is pushed to display a main menu on the display unit 18 in a first step ST1. At this time, a main menu 31a is displayed on the display unit 18 as shown in FIG. 2A. The main menu 31a displays seven menu modes. The first menu mode represents "PROGRAM LIST", the second menu mode "PROGRAM SETUP", the third menu mode "SATELLITE ASSIGNMENT", the fourth menu mode "RESERVATION SET", the fifth menu mode "DISPLAY SELECT", the sixth menu mode "SECRET CODE", and the seventh menu mode "DEMONSTRATION".

Figure 2B:
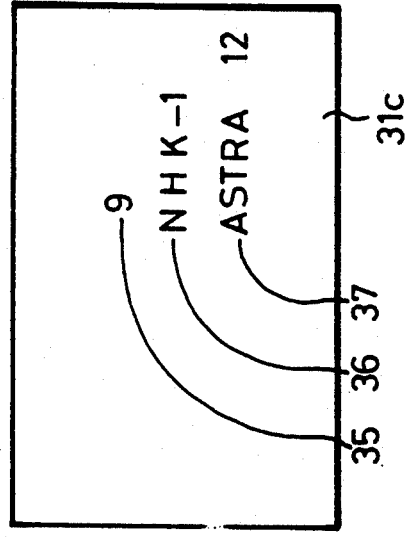

By way of example, the user pushes a "V" key on the remote control unit 28b, which is represented by a displayed symbol 34, to move a cursor 32 in the main menu to the fifth menu mode, "DISPLAY SELECT", in a second step ST2. Then, with the cursor 32 at the fifth menu item, a ">" key (enter key) on the remote control unit 28b is pushed in a third step ST3, whereupon the display unit 18 displays display select menu information 31b as shown in FIG. 2B. The display select menu information 31b includes items such as "LABEL", "SATELLITE/CHANNEL", and "SOUND MODE". If the television receiver is designed for use in Europe, for example, provision may be made for the user to store six characters, for example, in the memory after having purchased the television receiver. The item "LABEL" indicates the stored characters, and is used to select a predetermined channel. The item "SATELLITE/CHANNEL" is used to select a satellite type and channel number. The item "SOUND MODE" is used to select a language such as English, French, or the like, and a quality of reproduced sound. These items are displayed in "ON" state on the display unit 18. In a fourth step ST4, the "V" key on the remote control unit 28b is pushed twice to move the cursor 32 to the item "SOUND MODE", where the cursor 32 blinks.

Figure 2D:
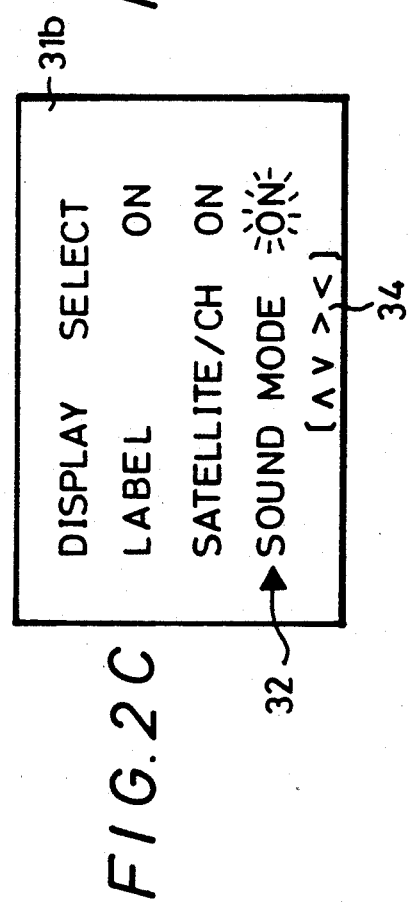

Then, the ">" key on the remote control unit 28b is pushed once in a fifth step ST5. The cursor 32 no longer blinks, but the displayed item "ON" on the right side of the item "SOUND MODE" starts to blink. If "SOUND MODE" is to be canceled, then "ON" is changed to "OFF" using the "L" or "V" key on the remote control unit 28b. If "SOUND MODE" is not to be canceled, then "ON" remains unchanged. The items "ON" and "OFF" are toggle items. When "SOUND MODE" is canceled, then a selected standard menu command 31c is displayed with "SOUND MODE" erased, as shown in FIG. 2D, in a seventh step ST7. The number "9" displayed in the standard menu command 31c represents a program number 35, the item "NHK-1" a label 36, and the item "ASTRA 12" a satellite type and channel number 37.

Figure 3A:
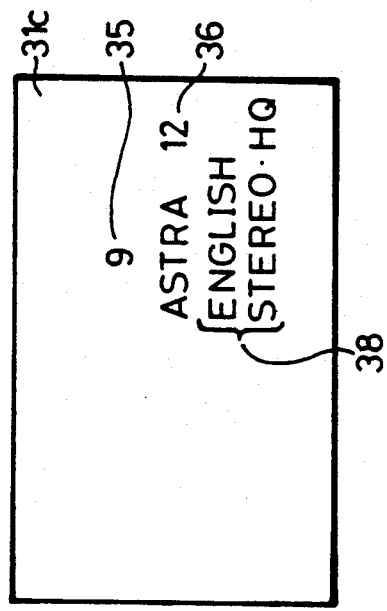
FIGS. 3A through 3E are views showing the manner in which menu commands are displayed by the television receiver according to the present invention.
Figure 3C:
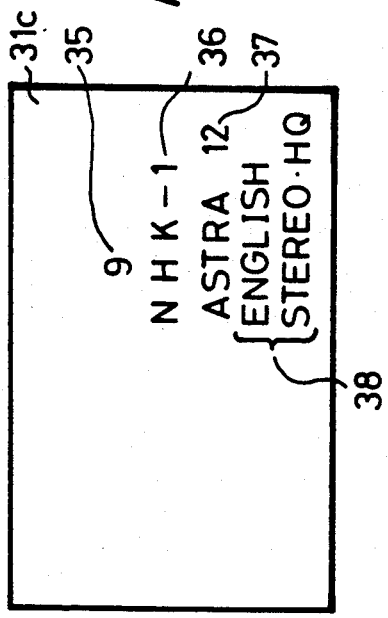
Figure 3B:
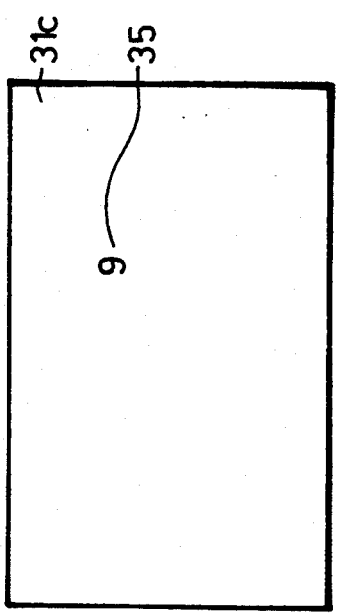
Figure 3D:
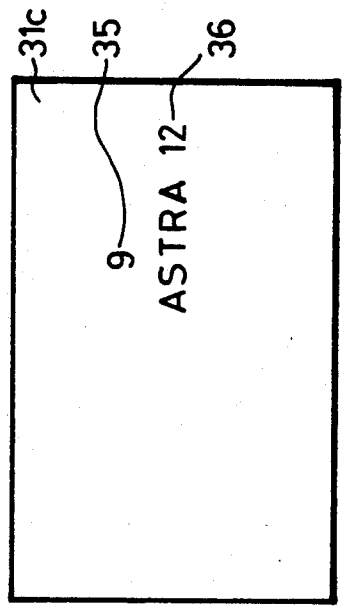

The user stores the number of a preferred channel in the program number 35, and the program number 35 is used for the user to have a clue in receiving the channel. If all the items "LABEL", "SATELLITE/CHANNEL", "SOUND MODE" in the menu information shown in FIG. 2B are "ON", then the displayed standard menu command 31c becomes displayed standard men command 31c as shown in FIG. 3A, displaying all the program number 35, the label 36, the satellite type and channel number 37, and also a sound mode 38. Conversely, if all the items "LABEL", "SATELLITE/CHANNEL", "SOUND MODE" in the menu information shown in FIG. 2B are "OFF", then only the program number 35 is displayed as shown in FIG. 3D, erasing the label 36, the satellite type and channel number 37, and the sound mode 38.

Figure 3E:
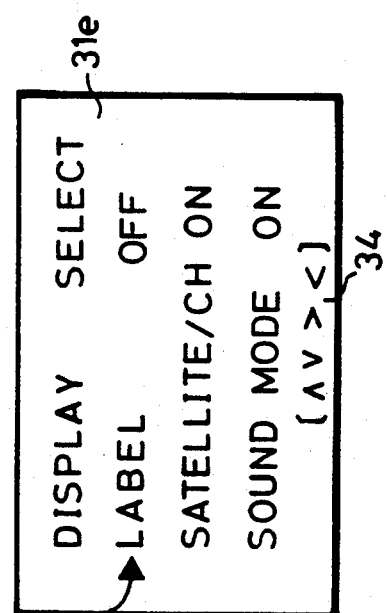

Other menu commands will be described below with reference to FIGS. 3B, 3C, and 3E. If the label is to be erased, the cursor is moved to "LABEL" as shown in FIG. 3E. Then, the ">" key on the remote control unit 28b is pushed to blink "ON" on the right of "LABEL", and then the "Λ" key on the remote control unit 28b is pushed to select "OFF", whereupon a menu command with the label 36 erased is displayed as shown in FIG. 3B. FIG. 3C shows a menu command with the label and the sound mode erased.

Since one or more of the displayed menu items can be selected and selectively be displayed and erased. Therefore, only those menu items which are used to change channels, for example, can be selected and displayed for a simplified displayed menu command. The displayed menu command is easy for the user to see and deal with because unwanted menu items may be omitted.

While the menu mode "DISPLAY SELECT" has been described above, the other menu modes such as "SATELLITE ASSIGNMENT" may similarly be selected and processed.

Having described a preferred embodiment of the invention with reference to the accompanying drawings, it is to be understood that the invention is not limited to that precise embodiment and that various changes and modifications can be effected by one skilled in the art without departing from the spirit or scope of the invention as defined in the appended claims.

What is claimed is:

1. A television receiver comprising:
    circuit means for receiving a television signal and producing a video signal and a sound signal from said received television signal;
    display means for displaying an image based on said video signal; and
    control means for controlling said circuit means, said control means comprising means for adding to said video signal a menu display signal representing a plurality of menu items and for selectively deleting said items under the direction of a user of the apparatus, whereby all or only selected ones of said menu items can be displayed on said displayed means.

2. A television receiver according to claim 1 wherein said menu items include menu items representing a television channel and a sound mode.

3. A television receiver according to claim 1 wherein said circuit means includes a BS receiver for receiving said television signal broadcast from satellite.

4. A television receiver according to claim 1 wherein said control means comprises a character generator for generating characters representing said menu items and said control means controls said character generator.

* * * * *